US009866599B2

United States Patent

(12) United States Patent
Boneh et al.

(10) Patent No.: US 9,866,599 B2
(45) Date of Patent: Jan. 9, 2018

(54) INTEGRATION OF SCHEDULED MEETINGS WITH AUDIO-VIDEO SOLUTIONS

(71) Applicant: Polycom, Inc., San Jose, CA (US)

(72) Inventors: Rami Boneh, Louisville, CO (US); Joanne Kubischta, Westminster, CO (US); Paul Regenhardt, Westminster, CO (US); Alan Segal, Westminster, CO (US); Jeff Adams, Lafayette, CO (US); Aviv Eisenberg, Tel-Aviv (IL); Adam Jacobs, San Jose, CA (US); Erez Avraham, San Jose, CA (US); Eran Decker, Givataeeim (IL); Assaf Weissblat, Petach-Tikvah (IL); Noa Reiter, Rehovot (IL); Boris Sirotin, Petach-Tikvah (IL); Inga Levi, Petach-Tikvah (IL)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/066,498

(22) Filed: Mar. 10, 2016

(65) Prior Publication Data

US 2016/0269687 A1 Sep. 15, 2016

Related U.S. Application Data

(60) Provisional application No. 62/131,104, filed on Mar. 10, 2015.

(51) Int. Cl.

| | |
|---|---|
| ***H04N 7/15*** | (2006.01) |
| ***H04L 29/06*** | (2006.01) |
| ***H04L 12/18*** | (2006.01) |

(52) U.S. Cl.

CPC ...... *H04L 65/1086* (2013.01); *H04L 12/1813* (2013.01); *H04L 12/1822* (2013.01); *H04L 65/1069* (2013.01); *H04L 65/403* (2013.01); *H04N 7/152* (2013.01)

(58) Field of Classification Search

CPC ... H04N 7/155; H04L 65/1086; H04L 65/403; H04L 65/1069

See application file for complete search history.

(56) References Cited

U.S. PATENT DOCUMENTS

| | | | | |
|---|---|---|---|---|
| 9,374,233 | B2 * | 6/2016 | Narayanan | H04N 7/152 |
| 2006/0233120 | A1 * | 10/2006 | Eshel | H04L 12/1822<br>370/260 |
| 2009/0055475 | A1 * | 2/2009 | Sekaran | H04L 12/1818<br>709/204 |
| 2014/0225982 | A1 * | 8/2014 | Avni | H04N 7/152<br>348/14.09 |
| 2015/0236905 | A1 * | 8/2015 | Bellan | H04L 41/0806<br>709/222 |
| 2016/0088111 | A1 * | 3/2016 | Wilson | H04L 65/403<br>709/204 |

* cited by examiner

*Primary Examiner* — Stella Woo

(74) *Attorney, Agent, or Firm* — Blank Rome, LLP

(57) ABSTRACT

An intermediary server allows endpoints connected to two different types of conferencing systems to participate in an integrated conference without requiring plugins to be installed at each endpoint. A conference identifier provided by a first type of conferencing system can be used by endpoints of a second type of conferencing system by allowing the intermediary server to send the conference identifier to a server of the first type of conferencing system and receive a link that a server of the second type of conferencing system can use to connect to the first type of conferencing system.

18 Claims, 6 Drawing Sheets

110A EP 310A LYNC MCU FEDERATED MCU EP 110B 110C FEDERATED MCU EP LYNC MCU 310B 300 340 CAA 350 NETWORK 140 NON-LYNC MCU 150 DMA 110C EP 110D EP 330 LYNC MCU FEDERATED ON-PREMISES MCU

INTEGRATION OF SCHEDULED MEETINGS WITH AUDIO-VIDEO SOLUTIONS

TECHNICAL FIELD

The present invention relates to the field of videoconferencing, and in particular to a technique for integrating schedule Microsoft OUTLOOK LYNC meetings with third party audio-video solutions.

BACKGROUND ART

Enterprises that use Microsoft OUTLOOK® and LYNC® services can schedule online conferences with OUTLOOK. OUTLOOK comes with a built in button to schedule online LYNC meetings. Recently, Microsoft renamed LYNC as SKYPE For Business, and all references to LYNC here should be understood to refer to SKYPE For Business as well. (OUTLOOK, LYNC, and SKYPE are registered trademarks of Microsoft Corp.)

When the meeting invitation is sent out, it includes a hyper link, a phone number, and a conference ID. Participants with LYNC clients who want to join the meeting just click the hyper link, their LYNC client launches, and the client joins the meeting. Participants who have only phone access at the time of the meeting can dial the phone number and can respond to audio prompts on the phone keypad by entering the conference Id that was sent in the OUTLOOK invitation.

While the Microsoft solution works in an all-Microsoft environment, in mixed environments there are difficulties. Participants that want to join the meeting from video equipment that does not support Microsoft LYNC cannot do it. When wanting to schedule an online video or audio meeting through OUTLOOK including third party audio video solutions, there is no built-in user interface (UI) in OUTLOOK to schedule the meeting, without employing a plug-in provided by the third party.

Currently vendors deploy a plugin to OUTLOOK to allow integration with the vendor's audio video solution. The plugin ensures a conference dial in number is sent with the meeting invitation, and resources are can be booked for the time of the conference.

This solution is inadequate. Among other things, it does not integrate with current Microsoft-scheduled LYNC clients. LYNC clients that want to join the meeting will need to dial this conference Id and cannot use the Microsoft solution flow that sends a hyper link to join the meeting. They are connected to the third party video equipment, and not to the Microsoft video servers. In addition, the plugin has to be deployed to all OUTLOOK users in the corporation, which can be a management challenge. A better approach to integrating LYNC conferences and non-LYNC conferences would be desirable.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
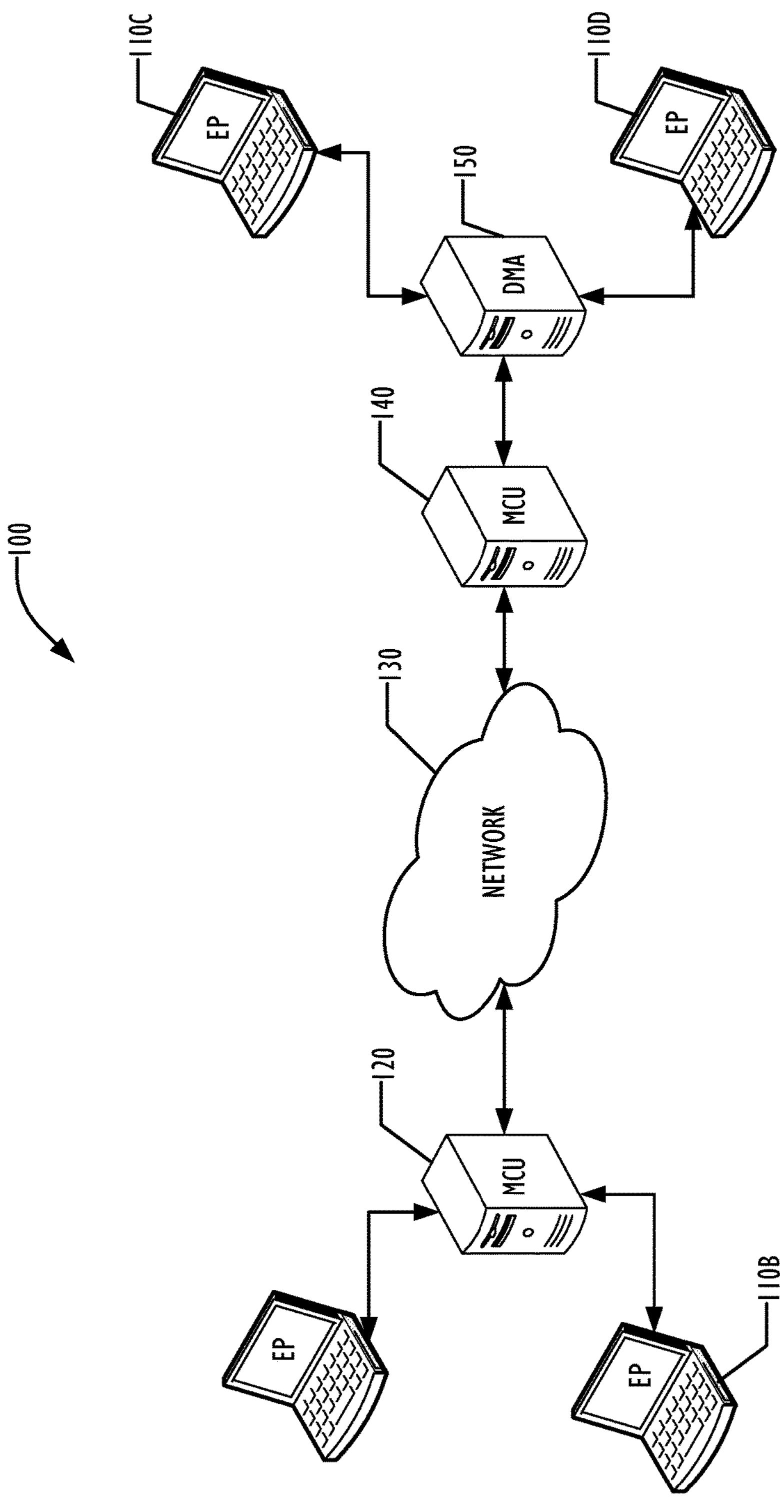
FIG. 1 is a schematic diagram illustrating a system for integrating a LYNC endpoint and non-LYNC endpoints into an integrated conference according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system. Similarly, a "programmable device" can refer to a single programmable device or a plurality of programmable devices together performing the function.

As used herein, the term "machine readable medium" can refer to a single physical medium or a plurality of physical media that together store the information described as being stored on the machine readable medium.

Although described herein as a technique for connecting between a LYNC conference and a non-LYNC conference, the techniques described below are not so limited, and similar techniques can be used to allow endpoints associated with two different conferencing systems to connect as a cascaded conference.

As disclosed herein, the user uses the Microsoft LYNC software as the user is accustomed to use them, without any plugins. A user schedules an online meeting using OUTLOOK's built-in LYNC meeting button. LYNC users can join the meeting by clicking the hyperlink they receive in the invitation and be connected to the Microsoft LYNC multipoint control unit (MCU), sometimes referred to as an audio video MCU (AVMCU). All that is standard Microsoft flow. Participants with video or audio equipment that cannot dial in to the LYNC server can dial the conference ID that was sent with the meeting invitation and join a conference on a third party MCU. The third party MCU creates a cascade link to the LYNC MCU. Participants on both side of the cascade conferences will see a continuous presence of video of endpoints from both sides of the conference. Thus, both integration between LYNC and non-LYNC conferencing systems is provided without requiring installation of a plugin.

FIG. 1 illustrates a system 100 for allowing non-LYNC endpoints to connect to a LYNC conference according to one embodiment. A non-LYNC call server 150, such as a DMA® call server provided by Polycom, Inc. provides a dial rule using an identification such as "Dial by LYNC conference ID." (DMA is a registered trademark of Polycom, Inc.) By default, endpoints 110C and 110D that do not support the LYNC protocol are registered to the call server 150, using Session Initiation Protocol (SIP), H.323, or any other Media IP protocol. When the user dials the conference ID, the call will first hit the call server 150, which tries to resolve the dial string. In one embodiment, the call server 150 uses the configured dial rules and tries them by the order configured. If the dial rules above the new "Dial by LYNC conference ID" are not able to resolve the dial string, the LYNC dial rule is tried. The call server 150 queries a LYNC server 120 using a LYNC server protocol, passing the dialed string, which is assumed to be the conference id. As illustrated in FIG. 1, the LYNC server 120 is a LYNC MCU, but in some embodiments the LYNC server 120 may be a separate programmable device from the LYNC MCU that handles the conference itself. The LYNC server 120 responds with a conference focus Uniform Resource Identifier (URI), which is used to dial in to the LYNC conference. In some embodiments, the dial-in is done using the Session Initiation Protocol (SIP), but other protocols can be used. If the LYNC server 120 returns an indication that the conference ID was not found, the dial rule fails and the call server 150 may try any other configured dial rules. However, if the LYNC server 120 successfully returns a focus URI, the dial rule is resolved. The call server 120 then starts a conference on an MCU 140 (such as a Polycom RMX® MCU) using an RMX Application Programming Interface (API) and passes the focus URI in with the start command. (RMX is a registered trademark of Polycom, Inc.) Other ways of starting the conference may be used as desired. In one embodiment, the non-LYNC MCU 140 is configured or registered to the call server 150. Although only a single LYNC MCU 120, non-LYNC MCU 140, and call server 150 are illustrated in FIG. 1 for clarity, the system 100 can employ any number of those components as desired. Similarly, although the call server 150 and MCU 140 are illustrated as separate components, in some embodiments they may be integrated into a single system.

Although the endpoints 110 are illustrated in the Figures as laptop computers, they can be any type of programmable device capable of participating in an audio or video conference, including desktop computers, telephones, and mobile devices such as smart phones or tables. The examples of the Figures are not intended to imply that only those elements shown in the Figures are present. One of skill in the art will also recognize that a LYNC system may employ other devices that provide functionality to the LYNC system. Similarly, the non-LYNC systems illustrated in the Figures may employ other devices than are illustrated in the Figures to provide functionality to the non-LYNC system.

The non-LYNC MCU 140 then starts the non-LYNC conference and the calling participant connects to the non-LYNC conference. The non-LYNC MCU 140 dials to the LYNC server MCU 120 using the passed in focus URI and a cascade link is created between the non-LYNC conference that was just created and the LYNC scheduled conference. From then on LYNC participants who click the invitation hyperlink in the OUTLOOK message join the conference on the LYNC MCU 120 conference side and non-LYNC endpoints 110C and 110D that dial the conference ID are routed through the call server 150 to the non-LYNC conference side. Although for clarity the system 100 of FIG. 1 shows only four endpoints 110, any number of endpoints 110 may connect to the conference either as LYNC endpoints or non-LYNC endpoints, such to any constraints that may be imposed on the conferences by the respective MCUs 120 and 140 or the call server 150.

In one embodiment, non-LYNC video participants can see a plurality of LYNC participants in a continuous presence layout. The maximum number of LYNC participants may be constrained by limitations in the LYNC MCU 120. In some embodiments, the maximum number of active LYNC participants may be a predetermined number, such as 5. In some embodiments, LYNC participants may be able to see a continuous presence presentation of multiple non-LYNC participants. In other embodiments, LYNC participants may see only one of the non-LYNC participants, in addition to other LYNC participants. Where multiple non-LYNC participants are in an integrated conference, embodiments may select which non-LYNC participant is displayed to LYNC participants, such as by displaying the active speaker based on audio energy.

Preferably, embodiments do not require a plugin to be installed into OUTLOOK as in conventional LYNC/non-LYNC conferences, although some embodiments may employ an OUTLOOK plugin that provides additional functionality. By using these techniques, embodiments described herein can integrate scheduled LYNC meetings with non-LYNC solutions.

When a LYNC user schedules a conference, the invitation sent by Outlook includes a phone number and a conference ID, in addition to a hyperlink, allowing users to call into the conference using an ordinary telephone. A LYNC user receiving the invitation can simply click on the hyperlink and be connected to the LYNC server and MCU 120. A non-LYNC user receiving the invitation can use the conference ID to connect to the conference, using the conference ID as the number to dial for the conference. The non-LYNC endpoint 110 is registered to the call server 150. Dial rules in the call server 150 are used to control the connection to the LYNC conference.

In one embodiment, a new dial rule allows connection to a LYNC server 120 from the call server 150 via network 130, in one embodiment using a Microsoft extension to SIP, the Centralized Conference Control Protocol (CCCP), to obtain a focus URI from the LYNC MCU 120. If the LYNC MCU 120 recognizes the conference ID, the LYNC MCU 120 returns the focus URI. If the LYNC MCU 120 does not recognize the conference ID, the LYNC MCU 120 will indicate that, causing the call server 150 to try a different dial rule. Network 130 may be a single network or an interconnected plurality of networks, such as the Internet. Although endpoints 110 are shown directly connected to LYNC MCU 120 and call server 150 for clarity, the endpoints 110 are typically connected via the same or other networks.

The call server 150, upon receiving the focus URI, can then use an application programming interface (API) of the non-LYNC MCU 140 to start a conference on the non-LYNC MCU 140, causing the non-LYNC MCU 140 to use the focus URI to connect to the LYNC MCU 120, creating a cascading link between the LYNC MCU 120 and the non-LYNC MCU 140.

Each type of endpoint 110 connects to their usual MCU 120 or 140. LYNC endpoints 110 thus connect and get their usual LYNC user experience, while non-LYNC endpoints 110 connected via the non-LYNC MCU 140 can get their usual non-LYNC user experience, such as a continuous presence user experience.

As indicated above, in one embodiment, LYNC endpoints 110 can see only a single non-LYNC participant, typically based on audio energy, so the active speaker is visible to LYNC participants, while non-LYNC endpoints may see multiple LYNC endpoints 110, up to a LYNC system maximum, in addition to the non-LYNC endpoints 110 in a continuous presence layout. In another embodiment, LYNC endpoints 110 may see multiple non-LYNC participants. The constraint on how many non-LYNC endpoints 110 are visible to the LYNC endpoints 110 is typically controlled by the LYNC MCU 120.

Figure 2:
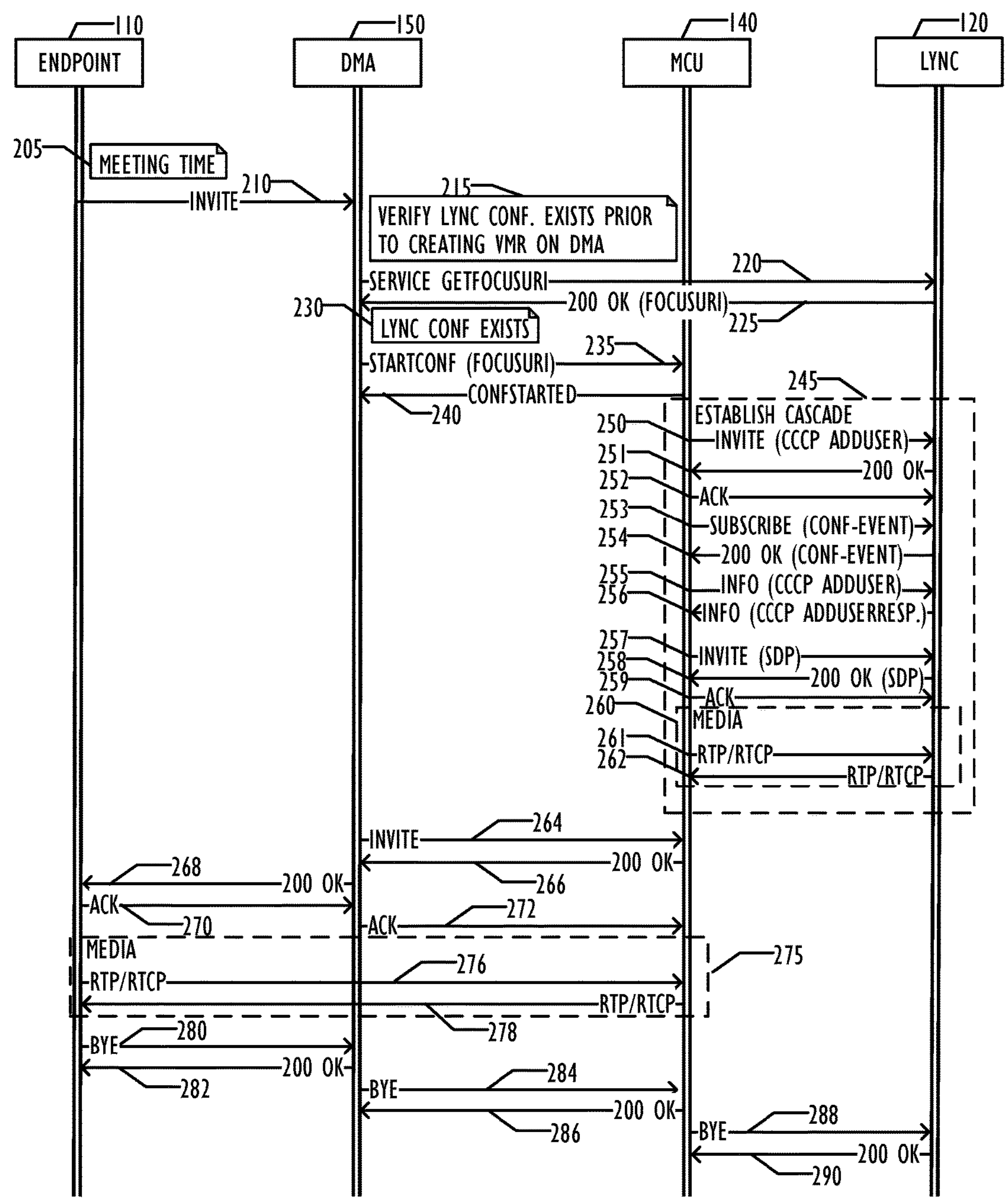
FIG. 2 is a flow diagram illustrating data flows between a non-LYNC endpoint and a LYNC system according to one embodiment.

FIG. 2 is a flow diagram illustrating dataflows for allowing non-LYNC endpoints 110 to participate in a LYNC conference according to one embodiment. For clarity, possible error messages and events are omitted from FIG. 2, and only those messages that further the participation are illustrated. Although described as "messages," no format or technique for sending the information contained in the message is required, although typically the messages are sent according the SIP protocol.

At meeting time 205, the non-LYNC endpoint 110 sends an INVITE request 210 to the call server 150 with the conference ID provided in the invitation. As indicated in block 215, the call server 150 verifies that the LYNC conference corresponding to the conference ID exists, before beginning the process of creating a virtual meeting room for setting up a conference on the MCU 140. The call server 220 does this by sending a SERVICE GETFOCUSURI request to the LYNC MCU 120, which responds back with a 200 OK message that includes the focus URI. At this point, as noted in block 230, the LYNC conference is confirmed to exist and the non-LYNC conference is initiated by the call server sending a STARTCONF (FOCUSURI) message 235 to the non-LYNC MCU 140. The non-LYNC MCU 140 responds back with a CONFSTARTED message 240.

The non-LYNC MCU 140 then starts cascading the non-LYNC conference into the LYNC conference as indicated by the dashed line 245. The non-LYNC MCU 140 sends an INVITE (CCCP ADDUSER) message 250 to the LYNC MCU 120, which responds with a 200 OK message 251. The non-LYNC MCU 140 acknowledges the response with ACK message 252, followed by a SUBSCRIBE (CONF-EVENT) message 253 identifying the conference ID associated with the conference to which the non-LYNC MCU 140 is attempting to connect. The LYNC MCU 120 responds with a 200 OK (CONF-EVENT) message 254.

The non-LYNC MCU 120 then sends an INFO (CCCP ADDUSER) message 255 indicating the endpoint 110 is joining the LYNC conference, to which the LYNC MCU 120 responses with an INFO (CCCP ADDUSERRESPONSE) message 256. The non-LYNC MCU 140 sends an INVITE (SDP) message 257, which the LYNC MCU 120 responds to with a 200 OK (SDP) message 258. The non-LYNC MCU 140 completes the handshaking with an ACK message 259.

At this point, the non-LYNC conference on the non-LYNC MCU 140 is cascaded to the LYNC conference on the LYNC MCU 120 and media may be sent and received as indicated in dashed line box 260, using RTP/RTCP messages 261 and 262. The non-LYNC MCU 140 then sends an INVITE message 264 to the call server 150 to which the call server responds with a 200 OK message 266. The call server 150 now responds to INVITE message 210 with a 200 OK message 268, causing the non-LYNC endpoint 110 to complete the handshake with the call server 150 with ACK message 270. The call server 150 may then complete the handshake with non-LYNC MCU 140 with ACK message 272.

Media may now be sent back and forth between the non-LYNC MCU 140 and the endpoint 110, as indicated in dashed line box 275, using RTP/RTCP messages 276 and 278.

When the endpoint 110 leaves or disconnects from the conference, the endpoint 110 sends a BYE message 280 to the call server 150, which responds with a 200 OK message 282. The call server 150 then sends a BYE message 284 to the non-LYNC MCU 140, causing the non-LYNC MCU 140 to respond with a 200 OK message 286. Finally, the non-LYNC MCU 140 sends a BYE message 288 to the LYNC MCU 120, which in turn responds with a 200 OK message 290. The connections are now broken and the endpoint 110 is no longer connected to the conference.

If the endpoint 110 was the last endpoint in the non-LYNC conference set up for cascading to the LYNC conference, the non-LYNC conference may now be terminated; if other endpoints 110 remain connected, then conference continues. In one embodiment, the call server 150 requests the non-LYNC MCU 140 to terminate the conference in that situation. Similarly, if the endpoint 110 was not the first endpoint 110 to connect to the non-LYNC conference, the non-LYNC conference setup steps described above were done prior to the current connection request, and do not need to be repeated for each endpoint connecting to the non-LYNC conference.

Figure 3:
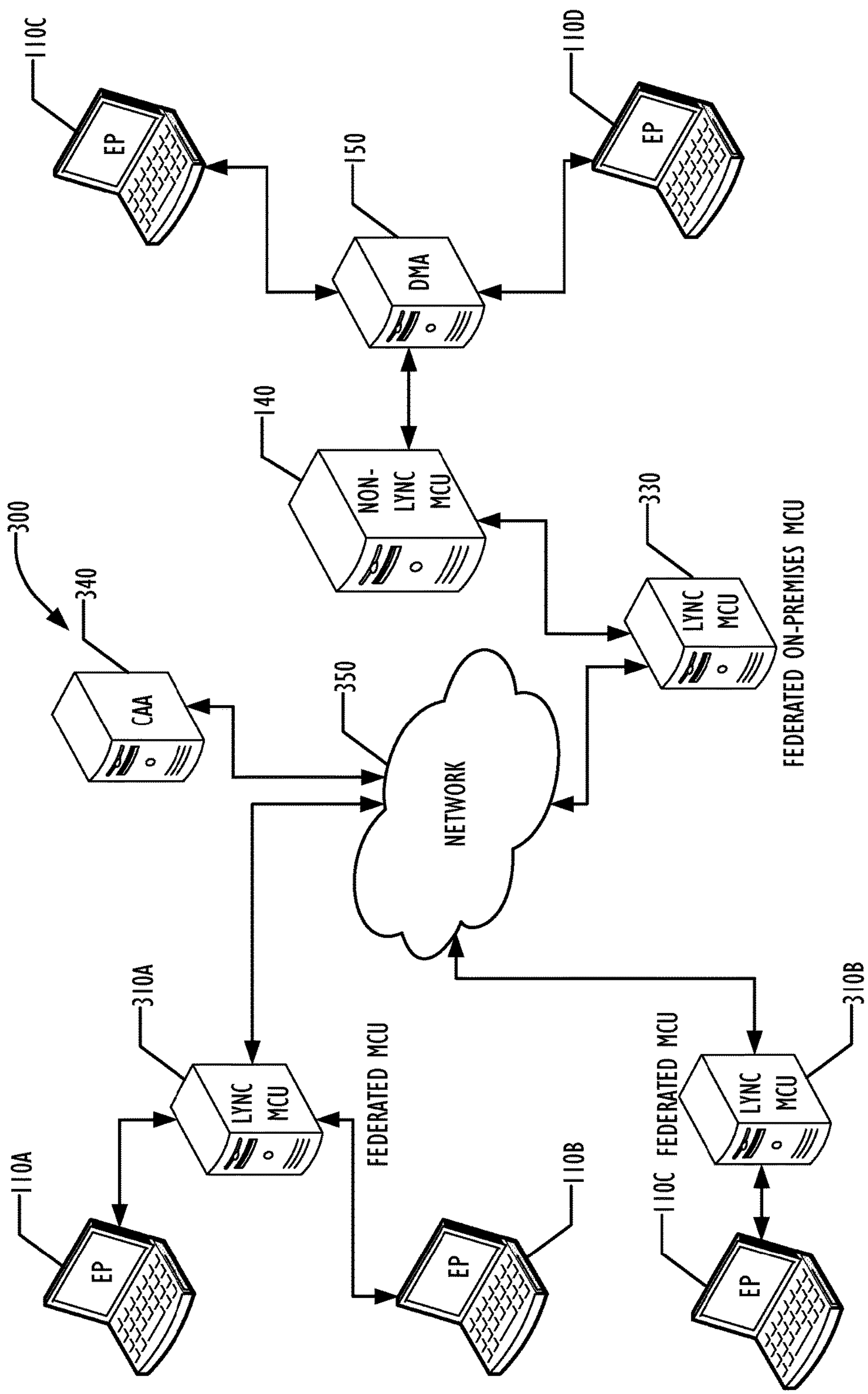
FIG. 3 is a schematic diagram illustrating a system for integrating a LYNC endpoint and non-LYNC endpoints into an integrated conference according to another embodiment.

In a further embodiment, illustrated in FIG. 3 in block diagram form as system 300, integration of LYNC and non-LYNC conferences can make use of LYNC federated system techniques. In such an embodiment, a service provider that has multiple customers using LYNC may have non-LYNC conferencing equipment, but no LYNC servers for use by LYNC endpoints. Instead, the service provider has a LYNC on-premises system 230 that is federated with the customer's LYNC servers 310A and 310B, using conventional LYNC federation techniques. In the example illustrated in FIG. 3, only two LYNC servers 310 and a single federated LYNC server 330 are illustrated, along with a single non-LYNC MCU 140 and call server 150, but any number of these components may be deployed as desired.

In this embodiment, when a non-LYNC endpoint 110 dials the conference ID provided by a LYNC endpoint user, the call server 150 cannot query the remote LYNC server (310A or 310B) to get the focus URI from the customer's LYNC server 310. In such an embodiment, a conference auto-attendant (CAA) server 340 allows endpoints to dial to the CAA 340. Upon connecting to the CAA 340, the endpoint 110 is asked to enter the conference ID, typically sent using dual-tone multi-frequency (DTMF) signaling. Upon receiving the conference ID, the CAA 340 passes the conference ID to the customer LYNC server 310A or 310B, which verifies the conference ID is known. If the conference ID is known, the LYNC server 310 will then cause the CAA 340 to drop the connection to the endpoint 110 and the LYNC server 310 to dial out to the endpoint 110, to bring the endpoint 110 into the conference. Because the LYNC servers 310A and 310B cannot call out to the non-LYNC endpoints 110C and 110D, to allow non-LYNC endpoints 110 to connect in this embodiment, dial rules are established in the non-LYNC call server 150 to allow connecting to the CAA server 340 instead of to the customer LYNC server 310. In one embodiment, the dial rule specifies a URI for the CAA 340 with a prefix indicating that the URI is for a CAA. Upon receiving a request to connect from a non-LYNC endpoint 110C or 110D, the call server 150 passes the non-LYNC MCU 140 the URI of the CAA 340. The non-LYNC MCU 140 then dials through the on-premises LYNC server 330 to the CAA 340, sends the conference ID to the CAA 340, and then the customer LYNC server 310 will dial back to the non-LYNC MCU 140 and start the conference. The non-LYNC MCU 140 uses the on-premises LYNC server 330, which is federated to the customer LYNC servers 310A and 310B, because the non-LYNC MCU 140 cannot dial the customer LYNC servers 310A or 310B directly.

When the customer LYNC server 310A or 310B dials back to the non-LYNC MCU 140, the LYNC on-premise server 330 acts as a router to pass the traffic to the non-LYNC MCU 140. As in the embodiment of FIG. 1, the non-LYNC MCU 140 starts a non-LYNC conference to which the non-LYNC endpoints 110 are connected, and cascades the non-LYNC conference into the LYNC conference run by the LYNC MCU 310.

In similar embodiments, in which LYNC servers are hosted in the cloud, instead of at a customer site, the cloud LYNC servers may also be reached using the CAA 340 as intermediary as described above.

Figure 4:
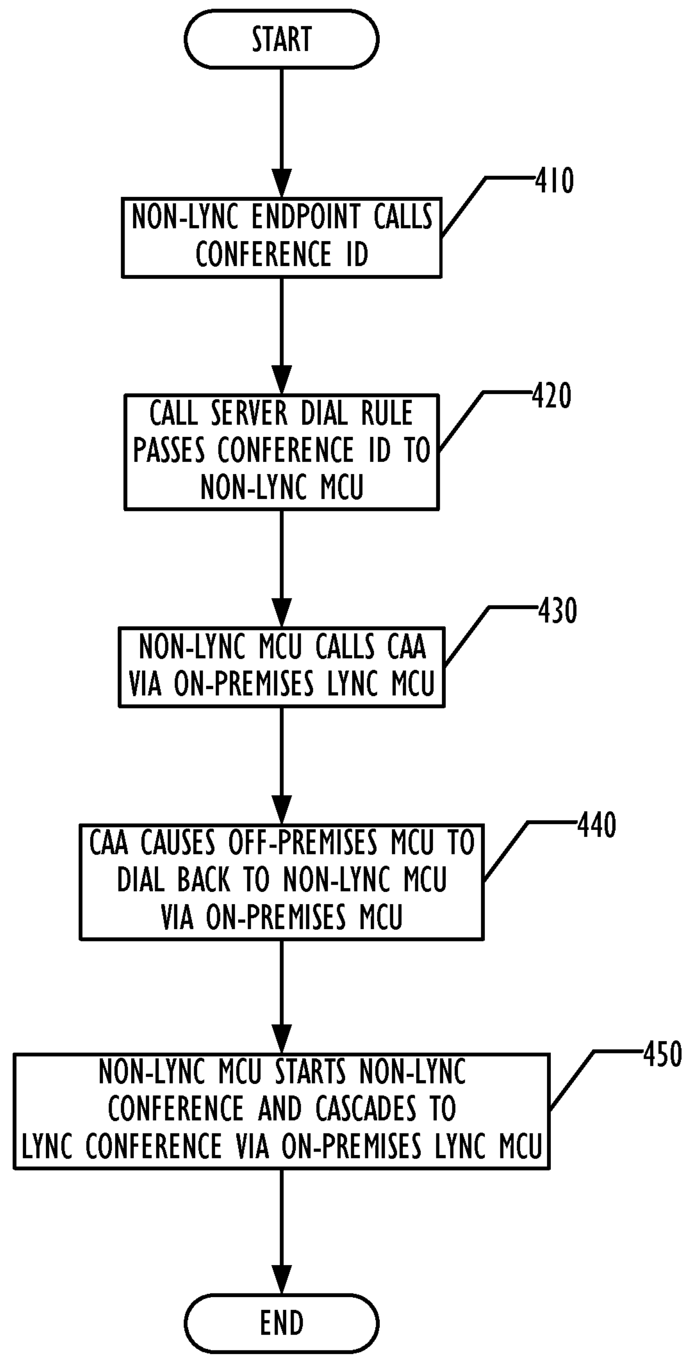
FIG. 4 is a flowchart illustrating a technique for allowing non-LYNC endpoints to participate in a LYNC conference according to one embodiment.

FIG. 4 is a flowchart illustrating the technique described in the embodiment of FIG. 3. In block 410, a non-LYNC endpoint, such as endpoint 110C or 110D, attempts to connect to a LYNC conference using the conference ID contained in a conference invitation. In block 420, the call server 150 receives the call attempt and uses a dial rule to pass the conference ID to the non-LYNC MCU 140 as a URI indicating that the URI is for a CAA 340. The non-LYNC MCU 140 then calls the CAA 340 via the on-premises LYNC MCU 330. The CAA 340 determines the conference ID is valid, closes the connection, and instructs one of the off-premises LYNC MCUs 310A or 310B to dial out to the non-LYNC MCU 140 via the on-premises federated LYNC MCU 330. The non-LYNC MCU 140 then starts a non-LYNC conference and connects the non-LYNC endpoint 110 to the non-LYNC conference and cascades the non-LYNC conference to the LYNC conference via the on-premises MCU 330. The conference proceeds as described above, with one or more non-LYNC endpoints 110 being displayed to the LYNC endpoints and one or more LYNC endpoints 110 being displayed to the non-LYNC endpoints for the duration of the conference.

Figure 5:
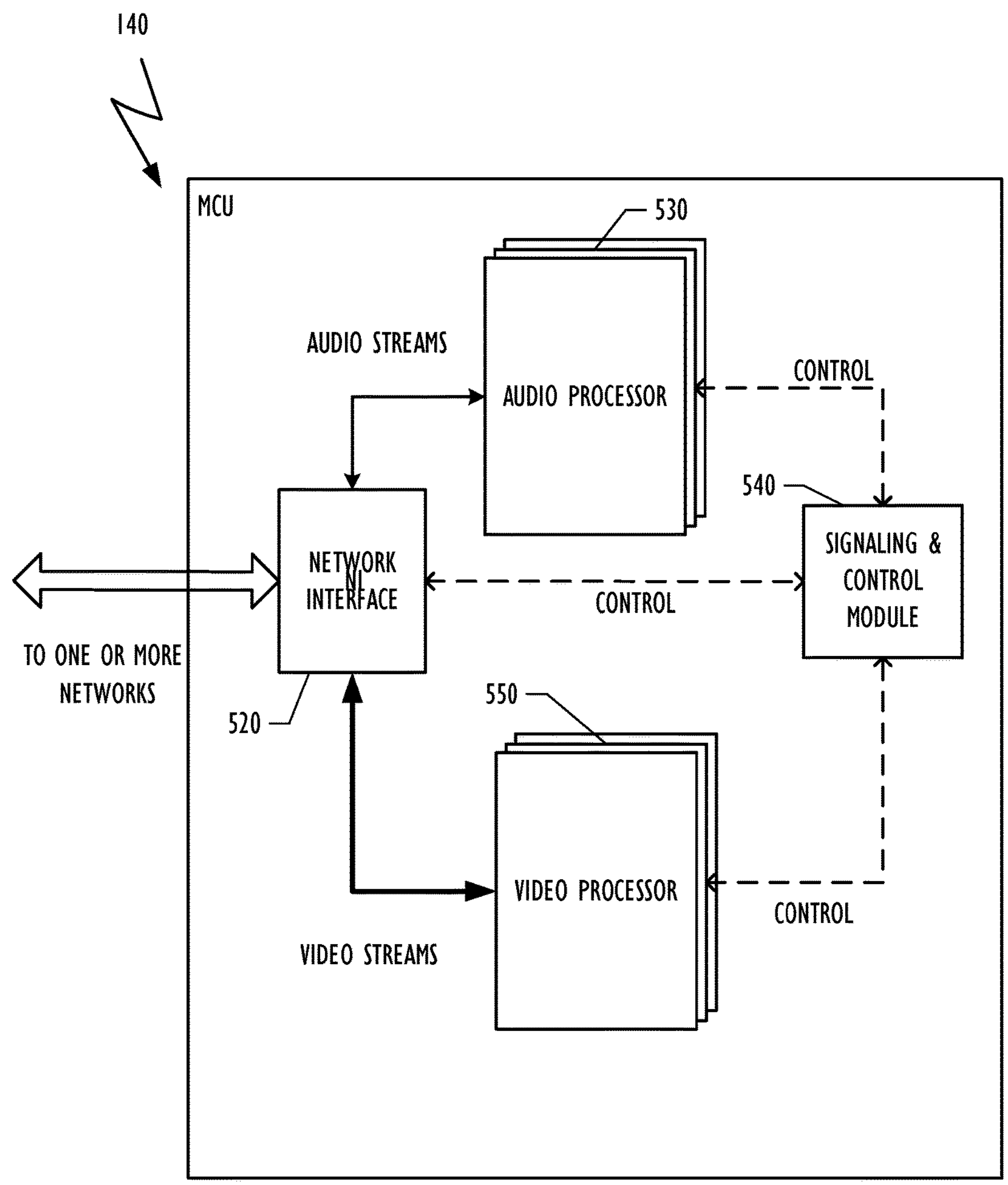
FIG. 5 is a block diagram illustrating a multipoint control unit for use in one embodiment.

FIG. 5 is a block diagram illustrating some relevant components of a non-LYNC MCU 140 according to one embodiment. A network interface 520 provides connectivity between the MCU 140 and networks such as the networks 130 and 350. One or more audio processors 530 process audio streams received over the network interface 520 and audio streams transmitted from the MCU 140 over the network interface 520. One or more video processors 550 process video streams received and transmitted via the network interface 520. A signaling and control module 540 provides control functionality for the MCU 140, including handling of dial-out and dial-in functionality that may be used for setting up conferences with endpoints 110 or cascading non-LYNC conferences with LYNC MCUs 120 and 310/330. In a federated system such as illustrated in FIG. 4, the signaling and control module 540 handles the connections to the CAA 340 via the federated on-premises LYNC MCU 330. One of skill in the art will recognize that other elements or components of an MCU that are not illustrated for clarity in FIG. 5 may be deployed in the MCU 140 as desired, and that the arrangement connectivity of FIG. 5 is illustrative and by way of example only. The signaling and control module typically includes one or more processing units that execute instructions stored in a memory, such as a storage device or random access memory, that when executed cause the MCU 140 to perform its function.

Figure 6:
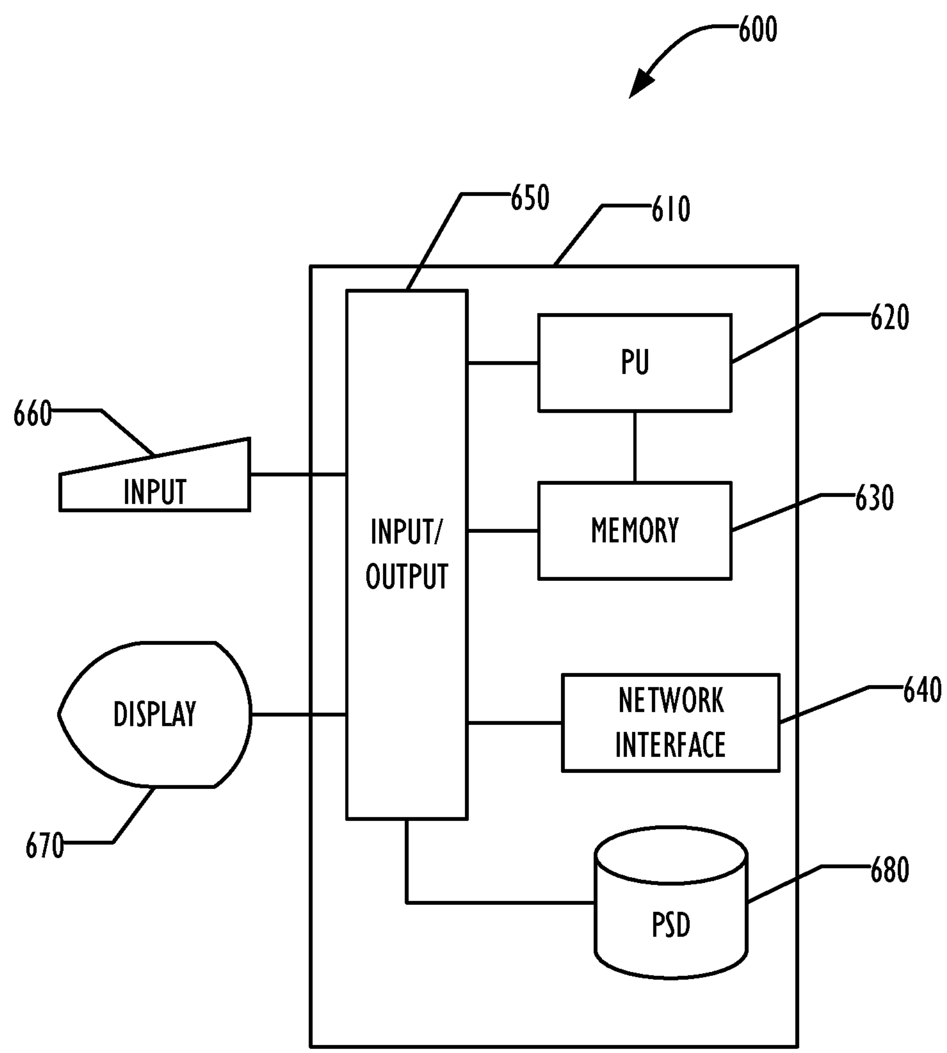
FIG. 6 is a block diagram of a programmable device for use in one embodiment.

FIG. 6 is a block diagram of a programmable device 600 that may be employed as a call server 150 or an endpoint 110 according to one embodiment. Example programmable device 600 comprises a system unit 610 which may be optionally connected to an input device or system 660 (e.g., keyboard, mouse, touch screen, etc.) and display 670. A program storage device (PSD) 680 (sometimes referred to as a hard disc) is included with the system unit 610. Also included with system unit 610 is a network interface 640 for communication via a network with other computing and networking devices (not shown). System unit 610 is be communicatively coupled to network interface 640. Program storage device 680 represents any form of non-volatile storage including, but not limited to, all forms of optical and magnetic, including solid-state, storage elements, including removable media, and may be included within system unit 610 or be external to system unit 610. Program storage device 680 may be used for storage of software to control system unit 610, data for use by the programmable device 600, or both.

System unit 610 may be programmed to perform methods in accordance with this disclosure. System unit 610 comprises a processor unit (PU) 620, input-output (I/O) interface 650 and memory 630. Processing unit 620 may include any programmable controller device including one or more members of the processor families in common use in computers, including multi-core processors. Memory 630 may include one or more memory modules and comprise random access memory (RAM), read only memory (ROM), programmable read only memory (PROM), programmable read-write memory, and solid-state memory. One of ordinary skill in the art will also recognize that PU 620 may also include some internal memory including, for example, cache memory. The program storage device 680 has stored on it instructions that when executed cause the programmable device 600 to perform its function.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A videoconferencing system, comprising:

a multipoint control unit of a first videoconferencing type, configured to:

receive instructions from a videoconferencing endpoint configured for videoconferences of the first videoconferencing type to join a videoconference of a second videoconferencing type designated by a videoconference identifier, the videoconference of the second videoconferencing type employing different videoconferencing protocols than videoconferences of the first videoconferencing type;

create a videoconference of the first videoconferencing type;

connect the videoconference of the first videoconferencing type to the videoconference of the second videoconferencing type via a first multipoint control unit of the second videoconferencing type; and connect the videoconferencing endpoint to the videoconference of the first videoconferencing type; and wherein the multipoint control unit of the first videoconferencing type is configured to connect to the first multipoint control unit of the second videoconferencing type via a second multipoint control unit of the second videoconferencing type.

2. The videoconferencing system of claim 1, further comprising:

a call server, configured to:

receive a request to join the videoconference of the second videoconferencing type from the videoconferencing endpoint;

obtain a uniform resource identifier associated with the videoconference of the second videoconferencing type from the first multipoint control unit of the second videoconferencing type; and request the multipoint control unit of the first videoconferencing type to join the videoconference of the second videoconferencing type using the uniform resource identifier.

3. The videoconferencing system of claim 2, wherein the call server is further configured to:

request a videoconference auto-attendant server associated with the first multipoint control unit of the second videoconferencing type to request a dial-out connection to the multipoint control unit of the first videoconferencing type by the first multipoint control unit of the second videoconferencing type.

4. The videoconferencing system of claim 1, wherein the second multipoint control unit of the second videoconferencing type is configured receive a dial-out connection from the first multipoint control unit of the second videoconferencing type.

5. The videoconferencing system of claim 1, wherein the multipoint control unit of the first videoconferencing type is configured to connect the videoconference of the first videoconferencing type to the videoconference of the second videoconferencing type via the first multipoint control unit of the second videoconferencing type by being configured to:

cascade the videoconference of the first videoconferencing type into the videoconference of the second videoconferencing type.

6. The videoconferencing system of claim 1, wherein the multipoint control unit of the first videoconferencing type provides a continuous presence layout including participants of the videoconference of the second videoconferencing type to participants of the videoconference of the first videoconferencing type.

7. A videoconferencing method, comprising:

receiving instructions from a videoconferencing endpoint configured for videoconferences of a first videoconferencing type to join a videoconference of a second videoconferencing type designated by a videoconference identifier, wherein videoconferences of the first videoconferencing type employ different protocols than videoconferences of the second videoconferencing type;

creating a videoconference of a first videoconferencing type;

connecting the videoconference of the first videoconferencing type to the videoconference of the second videoconferencing type via a first multipoint control unit of the second videoconferencing type;

connecting a multipoint control unit of the first videoconferencing type to the first multipoint control unit of the second videoconferencing type via a second multipoint control unit of the second videoconferencing type; and connecting the videoconferencing endpoint to the videoconference of the first videoconferencing type.

8. The method of claim 7, further comprising:

receiving a request to join the videoconference of the second videoconferencing type from the videoconferencing endpoint;

obtaining a uniform resource identifier associated with the videoconference of the second videoconferencing type from the first multipoint control unit of the second videoconferencing type; and requesting a multipoint control unit of the first videoconferencing type to join the videoconference of the second videoconferencing type using the uniform resource identifier.

9. The method of claim 8, further comprising:

requesting a videoconference auto-attendant server associated with the first multipoint control unit of the second videoconferencing type to request a dial-out connection to the multipoint control unit of the first videoconferencing type by the first multipoint control unit of the second videoconferencing type.

10. The method of claim 7, wherein connecting the multipoint control unit of the first videoconferencing type to the first multipoint control unit of the second videoconferencing type via the second multipoint control unit of the second videoconferencing type comprises receiving a dial-out connection from the first multipoint control unit of the second videoconferencing type via the second multipoint control unit of the second videoconferencing type.

11. The method of claim 7, wherein connecting the videoconference of the first videoconferencing type to the videoconference of the second videoconferencing type via the first multipoint control unit of the second videoconferencing type comprises:

cascading the videoconference of the first videoconferencing type into the videoconference of the second videoconferencing type.

12. The method of claim 7, further comprising:

providing a continuous presence layout to the videoconferencing endpoint that includes participants of the videoconference of the second videoconferencing type.

13. A non-transitory machine readable medium on which are stored instructions, comprising instructions that when executed cause a call server to:

receive a request to join a videoconference of a second videoconferencing type from a videoconferencing endpoint configured for videoconferences of a first videoconferencing type, wherein videoconferences of the first videoconferencing type employ different protocols than videoconferences of the second videoconferencing type;

request a multipoint control unit of the first videoconferencing type to connect to the videoconference of a second videoconferencing type via a first multipoint control unit of a second videoconferencing type; and request the multipoint control unit of the first videoconferencing type to create a videoconference of the first videoconferencing type and cascade the videoconference of the first videoconferencing type into the videoconference of the second videoconferencing type, wherein the multipoint control unit of the first videoconferencing type is configured to connect to the first multipoint control unit of the second videoconferencing type via a second multipoint control unit of the second videoconferencing type.

14. The machine readable medium of claim 13, wherein the instructions further comprise instructions that when executed cause the call server to:

connect to a videoconference auto-attendant server of the second videoconferencing type; and request the videoconference auto-attendant server of the second videoconferencing type to request the first multipoint control unit of the second videoconferencing type to connect to the multipoint control unit of the first videoconferencing type with a dial-out connection.

15. The machine readable medium of claim 13, wherein the request comprises a videoconference identifier received as part of an invitation by the videoconferencing endpoint.

16. The machine readable medium of claim 13, wherein the instructions that when executed cause the call server to request the multipoint control unit of the first videoconferencing type to connect to the videoconference of a second videoconferencing type comprise instructions that when executed cause the call server to:

request a uniform resource identifier corresponding to the first multipoint control unit of the second videoconferencing type from the first multipoint control unit of the second videoconferencing type; and provide the uniform resource identifier to the multipoint control unit of the first videoconferencing type.

17. The machine readable medium of claim 13, wherein the instructions further comprise instructions that when executed cause the call server to:

receive a request to disconnect the videoconferencing endpoint from the videoconference of the first videoconferencing type; and request the multipoint control unit to disconnect the videoconference of the first videoconferencing type from the videoconference of the second videoconferencing type.

18. The machine readable medium of claim 13, wherein the instructions further comprise instructions that when executed cause the call server to:

request termination of the videoconference of the first videoconferencing type responsive to a request to leave the videoconference of the first videoconferencing type from the videoconferencing endpoint.

* * * * *